US008769546B2

(12) United States Patent
Sasidharan Nair et al.

(10) Patent No.: US 8,769,546 B2
(45) Date of Patent: Jul. 1, 2014

(54) BUSY-WAIT TIME FOR THREADS

(75) Inventors: Rakesh Sasidharan Nair, Bangalore Karnataka (IN); Sherin Thyil George, Bangalore Karnataka (IN); Aswin Chandramouleeswaran, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 793 days.

(21) Appl. No.: 12/684,009

(22) Filed: Jan. 7, 2010

(65) Prior Publication Data

US 2011/0167428 A1 Jul. 7, 2011

(51) Int. Cl.
*G06F 9/46* (2006.01)

(52) U.S. Cl.
USPC ........... 718/107; 710/200; 710/220; 710/240; 711/147

(58) Field of Classification Search
None
See application file for complete search history.

(56) References Cited

U.S. PATENT DOCUMENTS

| 5,706,515 | A * | 1/1998 | Connelly et al. ............ 718/106 |
| 7,594,234 | B1 * | 9/2009 | Dice ............................. 718/108 |
| 2001/0014905 | A1 * | 8/2001 | Onodera ...................... 709/102 |
| 2005/0081204 | A1 * | 4/2005 | Schopp ......................... 718/100 |
| 2006/0048149 | A1 * | 3/2006 | Clift ............................ 718/100 |
| 2007/0300226 | A1 * | 12/2007 | Bliss ............................ 718/100 |
| 2008/0184238 | A1 * | 7/2008 | Ruemmler ..................... 718/102 |
| 2009/0320028 | A1 * | 12/2009 | Gellerich et al. ............ 718/102 |
| 2011/0126204 | A1 * | 5/2011 | Omara et al. ................. 718/103 |

OTHER PUBLICATIONS

Optimal Strategies for Spinning and Blocking L. Boguslayskyyz, K. Harzallahy Kreinenz, K Sevciky, and A. Vainshteinz Published: Jan. 1993.*
Empirical Studies of Competitive Spinning for a Shared-Memory Multiprocessor Anna R. Karlin, Kai Li, Mark S. Manasse, Susan Owicki Published: 1991.*
Real-Time Synchronization on Multiprocessors: To Block or Not to Block, to Suspend or Spin? Bjorn B. Brandenburg, John M. Calandrino, Aaron Block, Hennadiy Leontyev, and James H. Anderson Published: 2008.*
Adaptive Operating System Abstractions: A Case Study of Multiprocessor Locks Bodhisattwa Mukherjee and Karsten Schwan Published: 1994.*
Concurrent Programming : Microcomputers R.H. Perrott Published: 1982.*
Compiling the π-calculus into a Multithreaded Typed Assembly Language Tiago Cogumbreiro, Francisco Martins, Vasco T. Vasconcelos Published:2009.*
Monitors: An Operating System Structuring Concept C.A.R. Hoare Published:1973.*

* cited by examiner

*Primary Examiner* — Emerson Puente
*Assistant Examiner* — Paul Mills

(57) ABSTRACT

Method to selectively assign a reduced busy-wait time to threads is described. The method comprises determining whether at least one thread is spinning on a mutex lock associated with a condition variable and assigning, when the at least one thread is spinning on the mutex lock, a predetermined reduced busy-wait time for a subsequent thread spinning on the mutex lock.

15 Claims, 3 Drawing Sheets

BUSY-WAIT TIME FOR THREADS

BACKGROUND

Contemporary computing systems and devices implement the concept of multi-threaded programming. Multi-threaded programs can be executed on one or more processing units by dividing the programs into concurrently running tasks, such as threads. During the course of their execution, one or more threads may seek to share access to resources, such as memory addresses, files, etc. The access should not be concurrent so as to prevent output that may be erroneous. Logical mechanisms, such as mutual exclusion locks (mutex locks) ensure that a shared resource, being utilized by one thread, remains isolated from any subsequent incoming threads that seek to gain access to the same shared resource. The subsequent incoming threads, in such a case, may either sleep or may spin on the mutex lock till it is released and is made available again for acquiring.

The spinning of any thread can be specified by a busy-wait time. The default busy-wait time sets the number of spins the threads may make to acquire the mutex lock before sleeping. A thread spinning with the default spin value may consume a considerable amount of computational resources during execution.

Mutex locks can also be associated with condition variables. A thread, after acquiring a mutex lock which is associated with a condition variable, can either access the shared resource when the state of the condition variable is favorable or wait until the state of the condition variable becomes favorable. Once the state of the condition variable becomes favorable, the thread waiting on the condition variable can be called to acquire the mutex and gain access to the shared resource. Such a thread may spin on the mutex lock, if the mutex lock is not available.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
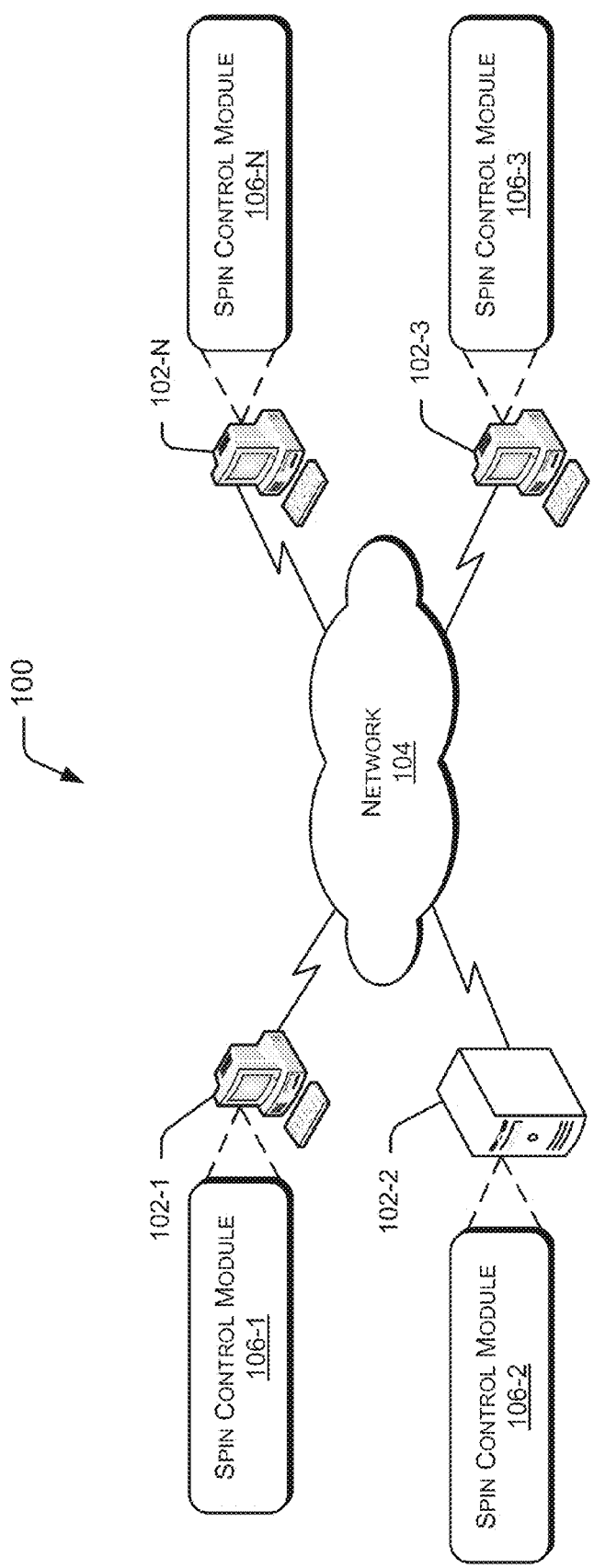
FIG. 1 illustrates an exemplary network environment having one or more computing devices for assigning a reduced busy-wait time for threads, according to an embodiment of the present invention.

Methods and devices for assigning a busy-wait time for threads spinning on a mutex lock are described herein. Contemporary computing devices and systems implement multi-programming, in which a single processing unit or multiple-processing units are configured to concurrently manage a plurality of program executions. However, the programs employed on such computing devices and systems are complex and utilize a large amount of computational resources during execution. The execution of such programs is divided into multiple sub-processes called threads.

A thread can be considered to be a sub-process of the running program and is capable of being executed on one or more processors. Since the concepts described herein are equally applicable to programs and threads (single or multiple), the term thread as used herein refers to a single-threaded program or to a single thread within a multi-threaded program.

While executing, critical regions of the threads may seek to concurrently access and share resources, such as memory, data structures, files, etc., during execution. A critical region can be understood as a segment of code where a thread attempts to exclusively access a shared resource. The exclusive access to the shared resource is provided to protect the coherency of the data associated with the shared resource by using mechanisms, such as a mutual exclusion lock (mutex lock).

The mutex lock protecting a shared resource can be acquired by an incoming thread. Once acquired, the thread can exclusively access the shared resource and proceed with its execution. Once the execution of the thread is complete, the acquiring thread releases the mutex lock allowing other threads to acquire the mutex lock and access the shared resource. For the duration that the thread holds the mutex lock, other incoming threads seeking to acquire the mutex lock and access the shared resource, either spin until the mutex lock is released or go to sleep. The spinning threads acquire the mutex lock once it is released by the previous thread and exclusively access the shared resource.

The spinning of the threads is specified in terms of a busy-wait time. The busy-wait time indicates the number of times a thread iteratively spins on, or polls, the mutex lock to check the availability of the mutex lock. The spinning thread may acquire the mutex lock if the mutex lock is released before the spinning thread completes the number of spins as prescribed by the busy-wait time. If the mutex lock is not acquired, the spinning thread, as described previously, can go to sleep after completing the prescribed number of spins as specified by the busy-wait time. A default busy-wait time for the spinning threads can be provided, which can be based on various factors, such as the computational environment in which the thread is executed, etc. Such a default busy-wait time may be set in a standardized software library of a computing system. It will be noted that the longer a thread spins, the more likely it is that the thread will acquire the mutex lock when it is released. However, a thread spinning for a large number of times, i.e., having a high busy-wait time consumes system overhead. Moreover, continuously spinning threads can also block other threads from attempting to acquire the mutex lock and access the shared resource, and hence, degrade system performance.

As mentioned previously, the thread may also go to sleep. For example, a thread may go to sleep after it has spun or polled the mutex lock, based on the busy-wait time assigned for the thread. When the thread goes to sleep, it yields its position on the processor's execution list. Threads that are sleeping can subsequently be woken, for example, through context switching. It should be noted that such operations, for example, waking sleeping threads, are computationally expensive.

Mutex locks can also be associated with programming constructs, such as condition variables, to facilitate inter-thread communication. Condition variables can be used for controlling the execution of the threads. The thread on acquiring the mutex lock, checks the state of the condition variable associated with the acquired mutex lock. If the state of the condition variable is favorable, the thread executes. If however, the state of the condition variable is not favorable, the thread blocks its own execution and releases the mutex lock for other threads to acquire. The thread releasing the mutex lock can go to sleep and wait for the condition variable to change to a state which is favorable. Once the state of the condition variable changes, one or more threads waiting for the condition variable can be notified. On receiving such a notification, the waiting threads can attempt to acquire the mutex lock. If at this stage the mutex lock is already acquired, the incoming threads can spin for the mutex lock to become available. In such cases, the spinning of threads is based on the default busy-wait time, i.e., the thread spins a fixed number of times as defined by the default busy-wait time. As mentioned before, if the threads spin a large number of times, the system performance is considerably degraded. It is, therefore, desirable that a suitable busy-wait time be assigned for the threads spinning on the acquired mutex lock such that the performance of the system is not adversely affected.

Known devices and systems attempt to determine a busy-wait time different from the default busy-wait time for the threads. The busy-wait times are calculated based on heuristic techniques. In such devices and systems, the busy-wait time is determined based on the busy-wait times for the threads, for which the mutex lock was successfully acquired in previous attempts. The determined busy-wait time can be applied for threads that seek to acquire the mutex lock. It will be noted that the determined busy-wait times, which are implemented for the threads, are an inaccurate estimate of the busy-wait time.

To this end, devices and methods are described for selectively assigning a reduced busy-wait time for a thread spinning on a mutex lock, which is associated with one or more condition variables. In one implementation, a first determination is made to ascertain whether the mutex lock, that is sought to be acquired by the thread, is associated with a condition variable. Once it is determined that the mutex lock is associated with the condition variable, a further determination is made to ascertain whether any other threads are spinning on the mutex lock or whether there are other threads waiting on the associated condition variable, for example, waiting for the state of the condition variable to become favorable.

If either of the further determinations is true, a reduced busy-wait time, which is less than the default busy-wait time, is selectively assigned for the thread. For example, the thread spins less number of times based on the reduced busy-wait time, provided there are other threads which are either waiting for the mutex lock to become available or are waiting for the condition variable to change. In one implementation, the reduced busy-wait times are computed deterministically in conformance with various use cases. Since the threads now wait for less number of times for the mutex lock to become available, the system performance is enhanced.

In case the mutex lock is not associated with a condition variable, the thread is allowed to spin with the default busy-wait time. This can be implemented by mechanisms that are known in the art. Therefore, in such a case, a thread spinning on the mutex lock, based on the default busy-wait time, will acquire the mutex lock once the mutex lock is released. Conversely, it may go off to sleep after spinning for a fixed number of times, based on the default busy-wait time.

Figure 2:
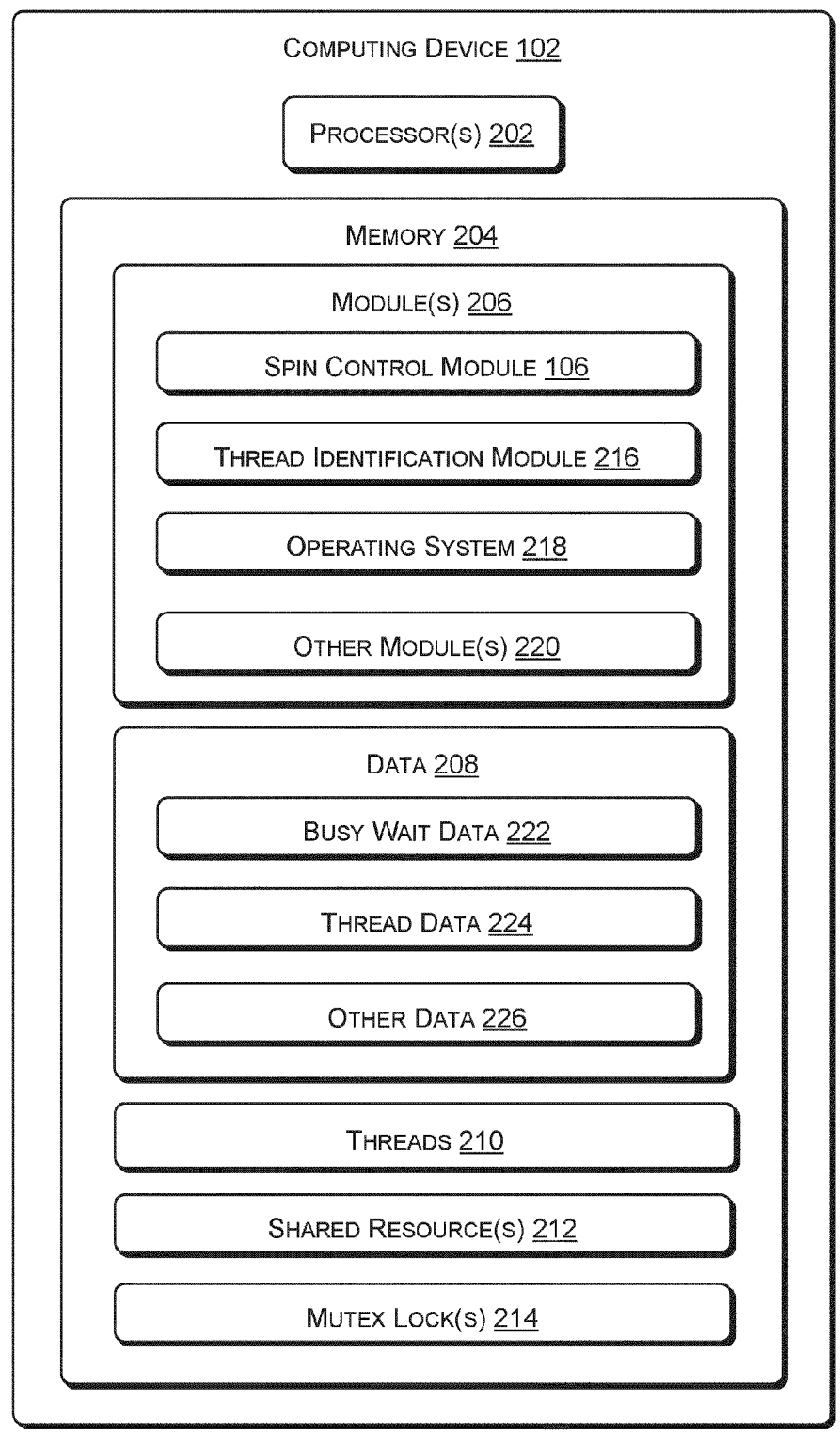
FIG. 2 illustrates an exemplary computing device for assigning the reduced busy-wait time for the threads, according to an implementation of the present invention.
Figure 3:
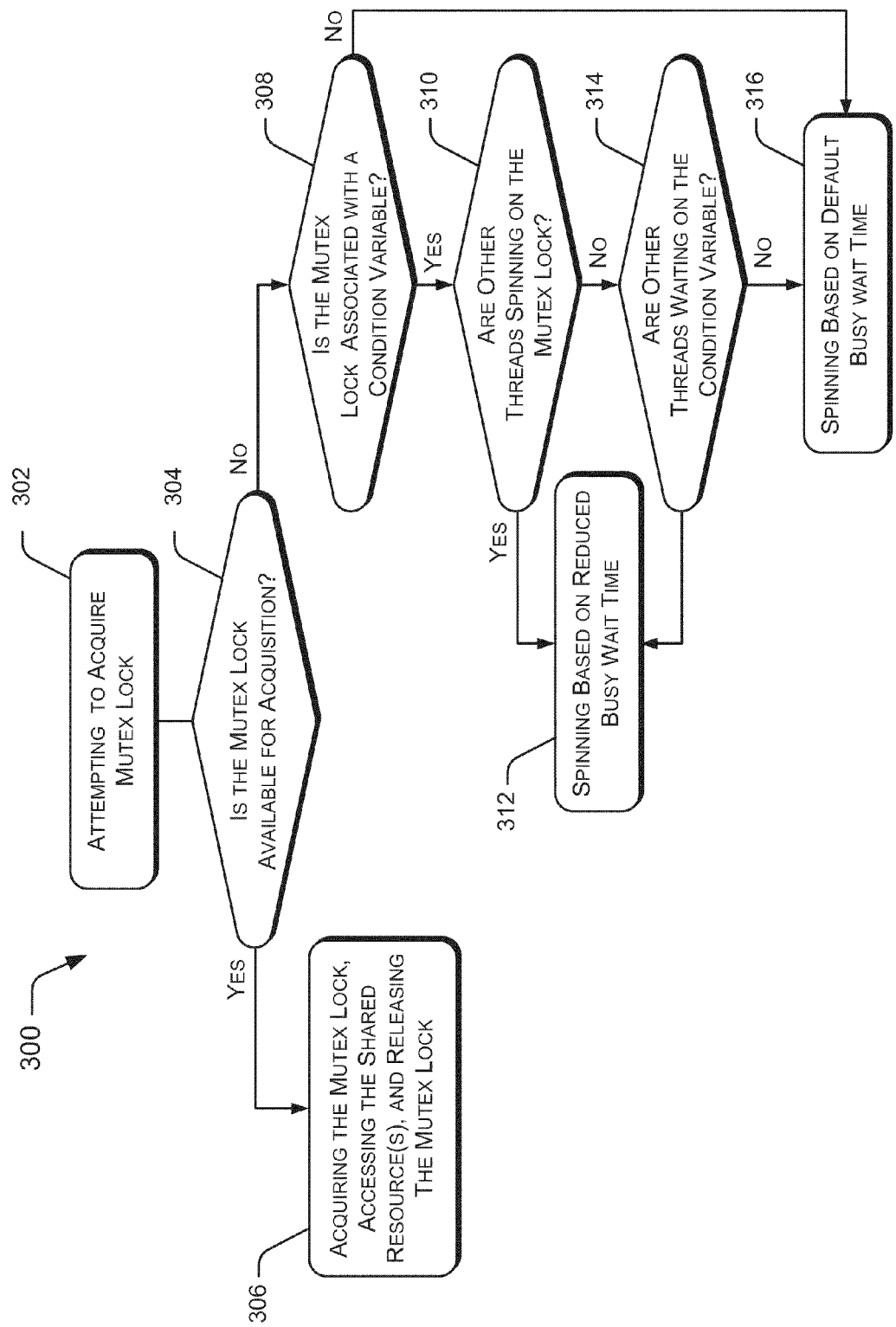
FIG. 3 illustrates an exemplary method for assigning the reduced busy-wait time for the threads, according to an implementation of the present invention.

The manner in which a reduced busy-wait time is assigned to a thread spinning on a mutex lock associated with a condition variable, shall be explained in detail with respect to the FIGS. 1-3. While aspects of systems and methods can be implemented in any number of different computing systems, environments, and/or configurations, the embodiments are described in the context of the following exemplary system architecture(s).

FIG. 1 illustrates an exemplary system 100 for assigning a reduced busy-wait time for threads, according to an embodiment of the present invention. The system 100 includes various computing devices 102-1, 102-2, 102-3, . . . 102-N, (collectively referred to as computing devices 102). The computing devices 102 can be a variety of devices, such as mainframes, personal computers, laptops, personal digital assistants (PDAs), servers, etc. The computing devices 102 communicate with each other over the network 104.

The network 104 may be a wireless network, wired network, or a combination thereof. The network 104 can be implemented as one of the different types of networks, such as intranet, local area network (LAN), wide area network (WAN), the internet, and such. The network 104 may either be a dedicated network, or a shared network, which represents an association of the different types of networks that use a variety of protocols, for example, Hypertext Transport Protocol (HTTP), Transport Control Protocol/Internet Protocol (TCP/IP), Wireless Application Protocol (WAP), etc., to communicate with each other.

Each of the computing devices 102 include spin control modules 106-1, 106-2, 106-3, . . . , 106-N (collectively referred to as spin control module 106), respectively. As mentioned previously, the executing programs can be divided into multiple threads. These threads may seek access to a shared resource. The execution of such threads can be synchronized using mutex locks associated with condition variables. As described before, the threads either execute or block their execution based on the state of the condition variable. If the state of the condition variable is favorable, the thread executes, and releases the mutex lock. However, if the state is unfavorable, the thread may release the mutex lock and may wait on the condition variable until a state favorable for its execution is achieved. On the contrary, if the thread is unable to acquire the mutex lock, then the thread spins on the mutex lock based on a busy-wait time. The threads spinning on the mutex lock may have a default busy-wait time assigned to them.

According to an implementation, the spin control module 106 selectively assigns a reduced busy-wait time for threads competing for the shared resource that is protected by a mutex lock. In one implementation, the spin control module 106 determines as to whether the mutex lock, which the incoming threads are attempting to acquire, is associated with a condition variable. If the mutex lock is associated with a condition variable, the spin control module 106 further determines whether any other threads are spinning on the mutex lock, waiting for the mutex lock to be released, or whether other threads are waiting on the associated condition variable, waiting for the state of the condition variable to become favorable.

If either of the further determinations is true, the spin control module 106 assigns a reduced busy-wait time for the incoming threads that are contending to acquire the mutex lock. In case both the determinations are found to be false, the spin control module 106 assigns a default busy-wait time for the incoming threads. In said implementation, the reduced busy-wait time is substantially less than the default busy-wait time for the thread.

The reduced busy-wait time results in a reduced number of times the thread spins on the mutex lock associated with the condition variable, i.e., number of times the thread queries or polls the mutex lock to check whether the mutex lock is available to any thread for acquiring.

The systems and devices as introduced in FIG. 1 are further described with reference to FIG. 2. FIG. 2 illustrates exemplary components of the computing device 102. In an embodiment, the computing device 102 includes processor(s) 202 coupled to a memory 204. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 are configured to fetch and execute computer-readable instructions stored in the memory 204.

The memory 204 may include a computer-readable medium known in the art including, for example, volatile memory, such as static random access memory (SRAM), dynamic random access memory (DRAM), etc., and/or non-volatile memory, such as erasable program read only memory (EPROM), flash memory, etc. In one implementation, the memory 204 includes module(s) 206, data 208, threads 210, shared resource(s) 212, and mutual exclusion lock(s) 214 (hereinafter referred to as mutex lock(s) 214). The threads 210 are indicated to be present in the memory 204 of the computing devices 102. It will be appreciated that the threads 210 when executing could also reside on the processor(s) 202.

The shared resource(s) 212 can include a computing-based resource that is shareable in a common manner among one or more entities, such as, threads 210, processes, etc., in the computing device 102. The threads 210 can further include a plurality of threads 210-1, 210-2, ..., 210-N, each of which may be responsible for executing a specific task. The shared resource(s) 212 includes resources, such as variables, shared memory, tasks lists, etc. It will be appreciated that the shared resource(s) 212 can either be present as a part of the memory 204 or within an independent circuitry integrated with the memory 204.

As mentioned earlier, the access of the shared resources, such as shared resource(s) 212, is synchronized to avoid any error during the execution of threads in the computing devices 102. To implement synchronization various exclusion mechanisms are utilized to ensure that one or more threads 210 contending for the shared resource(s) 212 do not access the shared resource(s) 212 simultaneously. In one implementation, the exclusion mechanism is implemented using mutex lock(s) 214. Mutex lock(s) 214 restricts the simultaneous access of the shared resource(s) 212 by the threads 210. As described previously, any one of the threads 210, say thread 210-1, seeking to access the shared resource(s) 212 first acquires the mutex lock(s) 214. In one implementation, the mutex lock(s) 214 is implemented as one or more data structures in the memory 204. The state of the mutex lock(s) 214 can be determined by way of the execution of coded instructions in the spin control module 106. For example, the spin control module 106 determines whether the mutex lock(s) 214 is acquired or has been released by a thread, say the thread 210-1.

Once the mutex lock(s) 214 is acquired, the thread 210-1 accesses the shared resource(s) 212 and executes. At this stage, the mutex lock(s) 214 is considered to be in a locked state, and is unavailable for acquiring by any of the threads 210. Once the execution of the thread 210-1 is complete, the thread 210-1 releases the mutex lock(s) 214. The released mutex lock(s) 214 can be subsequently acquired by another thread, say thread 210-2, that has either just arrived for accessing the shared resource(s) 212, or has been spinning for the mutex lock(s) 214 to become available. The thread 210-2 spins, i.e., polls whether the mutex lock(s) 214 is available, for a fixed number of times as defined by a default busy-wait time.

The module(s) 206 include the spin control module 106, a thread identification module 216, operating system 218, and other module(s) 220. The other module(s) 220 may include programs or coded instructions that supplement applications or functions performed by the computing device 102.

The data 208 includes busy-wait time data 222, thread data 224 and other data 226. The busy-wait time data 222 provides information, such as a default busy-wait time assigned to one or more threads 210 spinning on mutex locks that are not associated with a condition variable. The thread data 224 indicates whether the mutex lock(s) 214 is associated with one or more condition variables. In one implementation, the thread data 224 also indicates whether one or more threads 210 are spinning on a mutex lock(s) 214, or are waiting on the condition variable. The other data 226 includes data, such as data providing information about the state of the mutex lock(s) 214, i.e., acquired or released, the state of the condition variable, etc. The other data 226 can also include data that is generated as a result of the execution of one or more modules in the module(s) 206.

The mutex lock(s) 214 can also be associated with a condition variable. The condition variable can represent the data in the shared resource(s) 212, a particular state of the shared resource(s) 212, e.g., whether the shared memory is empty or not, or the occurrence of a certain event, such as a counter reaching a certain value. It will be appreciated that the state of the condition variable can be changed by any of the threads 210, say thread 210-1, once it has acquired the mutex lock(s) 214, accessed the shared resource(s) 212, and has completed execution. As mentioned previously, the thread 210-1 would execute itself based on the state of the condition variable. The thread 210-1 executes if the state of the condition variable is favorable. If the state of the condition variable is not favorable, the thread 210-1 releases the mutex lock(s) 214, without executing.

In operation, one or more threads 210 may seek to access the shared resource(s) 212 that are protected by the mutex lock(s) 214. If the mutex lock(s) 214 is available, one of the threads 210, say thread 210-1 acquires the mutex lock(s) 214. Once the mutex lock(s) 214 is acquired, the thread 210-1 can access the shared resource(s) 212 and completes its execution.

In one implementation, if the mutex lock(s) 214 is associated with one or more condition variables, the thread 210-1 executes based on whether the state of the condition variable is favorable or not. As stated previously, the thread 210-1 executes if the state of the condition variable is favorable and goes off to sleep and waits for the state of the condition variable to change, if the state of the condition variable is not favorable. Once the thread 210-1 completes executing, the mutex lock(s) 214 is released for acquiring by any of the other threads 210.

However, if the mutex lock(s) 214 is not available, i.e., it is already acquired, the incoming thread, say thread 210-1, would spin for the mutex lock(s) 214 to become available. At this stage, the spin control module 106 determines whether the mutex lock(s) 214 is associated with one or more condition variables. In one implementation, the association between the condition variable and the mutex lock(s) 214 is indicated in data, such as thread data 224.

If the mutex lock(s) 214 is not associated with one or more condition variables, the spin control module 106 assigns a default busy-wait time to the thread 210-1. In one implementation, the default busy-wait time is stored in the busy-wait time data 222. The thread 210-1 then spins, i.e., repetitively queries or polls to check the availability of the mutex lock(s) 214, for the number of times as specified by the default busy-wait time.

If the spin control module 106 determines that the acquired mutex lock(s) 214 is associated with a condition variable, it makes a further determination to check if any other thread, say thread 210-2, is spinning for the mutex lock(s) 214 to become available. In one implementation, the thread identification module 216 determines whether any one or more of the threads 210 are spinning on the mutex lock(s) 214. In another implementation, the thread identification module 216 determines whether any other threads, such as thread 210-2, are spinning for the mutex lock(s) 214 based on the thread data 224. In such a case, the thread data 224 indicating the association between the mutex lock(s) 214 and the condition variable is represented by a bit value in a field. For example, a set bit value in the field would indicate that the mutex lock(s) 214 is associated with one or more condition variables.

In one implementation, the thread identification module 216, on determining that the thread 210-2 is spinning on the mutex lock(s) 214, notifies the same to the spin control module 106. The spin control module 106 on receiving such a notification, assigns a reduced busy-wait time to the incoming thread, i.e., thread 210-1. Therefore, the thread 210-1 also spins on the mutex lock(s) 214 associated with a condition variable but with a reduced busy-wait time, given that any other threads, such as thread 210-2, are already spinning on the mutex lock(s) 214. As mentioned previously, the reduced busy-wait time is substantially less than the default busy-wait time. In this manner, the thread 210-1 spins less number of times in comparison with what it would have, if the thread 210-1 were to spin based on the default busy-wait time. In one implementation, the reduced busy-wait time and the default busy-wait time differ by three orders of magnitude.

In another implementation, the reduced busy-wait times is deterministically computed for scenarios conforming to one or more particular use cases. In such a case, multiple reduced busy-wait times which are pertinent to various use cases can be evaluated and stored, for example, stored in the busy-wait time data 224.

In one implementation, it may happen that the thread identification module 216 determines that none of threads 210 are already spinning on the mutex lock(s) 214. In such a case, the thread identification module 216 further determines whether one or more threads are waiting on the condition variable. As described previously, such threads that are waiting on the condition variable, say thread 210-3, may have released the mutex lock(s) 214 as soon as it was acquired, owing to an unfavorable state of the condition variable. In such a case, the thread 210-3 would go to sleep and would wait for condition variable to change. As soon as the condition variable changes, for example, due to the execution of some other thread, the thread 210-3 is woken up. The thread 210-3 again attempts to acquire the mutex lock(s) 214 so as to gain access to the shared resource(s) 212. If the mutex lock(s) 214 is already acquired, the thread 210-3 spins on the mutex lock(s) 214, waiting for it to become available.

In one implementation, the thread identification module 216 detects the threads that are waiting on the condition variable, such as thread 210-3, and notifies the same to the spin control module 106. The spin control module 106 on receiving such a notification, assigns a reduced busy-wait time to the thread seeking to acquire the mutex lock(s) 214, i.e., the thread 210-1. Therefore, the thread 210-1 spins on the mutex lock(s) 214 associated with a condition variable, but with a reduced busy-wait time, if any other threads, such as thread 210-3, are waiting on the condition variable. In this manner, the thread 210-1 spins less number of times in comparison with what it would have, if the thread 210-1 were to spin based on the default busy-wait time. In said implementation, the reduced busy-wait time is stored in the busy-wait time data 222.

Furthermore, in case the thread identification module 216 determines that none of the threads 210 are waiting for the condition variable, it may notify the same to the spin control module 106. The spin control module 106 on receiving such a notification assigns the default busy-wait time, obtained from the busy-wait time data 222, to one of threads 210, such as thread 210-1. In such a case, the thread 210-1 will spin based on the default busy-wait time and will acquire the mutex lock(s) 214 when it is released.

By way of illustration, an implementation of the present invention is described in relation with a master-worker thread model. In a master-worker thread model, master threads, such as thread 210-1, and worker threads, such as thread 210-2, 3 ..., N, may access a shared resource(s) 212. Examples of the shared resource(s) 212 include, but are not limited to, a shared queue, a shared tasks list, a to-do list, etc. In said implementation, the access to the shared resource(s) 212 is controlled by a mutex lock, such as the mutex lock(s) 214, and an associated condition variable.

In this implementation, the worker threads 210-2, 3, ..., N, require tasks to perform, the tasks being provided in the shared resource(s) 212, such as a shared tasks list. The state of the shared resource(s) 212 is indicated by a condition variable. In one implementation, the condition variable, when null, indicates that no tasks are present in the shared resource(s) 212. The master thread 210-1 intending to post tasks, will seek to access the shared resource(s) 212, and therefore, acquire the mutex lock(s) 214. Once the mutex lock(s) 214 is acquired, the shared resource(s) 212 is accessed and tasks are posted on the shared resource(s) 212. It will be appreciated, the master thread 210-1 is configured to repeatedly attempt to post tasks on the shared resource(s) 212 for processing by the worker threads 210-2, 3, ..., N. On posting the tasks, the master thread 210-1 changes the state of the condition variable to not null, indicating that the tasks are posted on the shared resource(s) 212.

Returning to the example, in order to obtain the posted tasks, a worker thread, such as the worker thread 210-2 accesses the shared resource(s) 212 by acquiring the mutex lock(s) 214, if it is available. On accessing the shared resource(s) 212, the worker thread 210-2 processes the task, i.e., the one task that was posted by the master thread 210-1. At this stage the other worker thread 210-3, for example, may spin, waiting for the mutex lock(s) 214 to be released by the worker thread 210-2. In such a case, the spin control module 106 assigns a default busy-wait time to the worker thread 210-3.

For a subsequent worker thread, say worker thread 210-4, the thread identification module 216 determines whether any threads are spinning on the mutex lock(s) 214. On finding the worker thread 210-3 to be spinning on the mutex lock(s) 214 a reduced busy-wait time is assigned to the worker thread 210-4. In one implementation, the reduced busy-wait time is assigned by the spin control module 106. In this manner, subsequent worker threads spin on the mutex lock(s) 214 based on the reduced busy-wait time.

The process continues till all the tasks have been picked by the worker threads 210-2, 3, ..., N. The worker thread, say worker thread 210-5, to pick the last task on the shared resource(s) 212, changes the condition variable to null, thereby indicating the shared resource(s) 212 to be empty.

Subsequent incoming worker threads, such as worker threads 210-6 and 210-7, attempting to pick tasks from the shared resource(s) 212, acquire the mutex lock(s) 214 and check the condition variable, one after the other. Since the condition variable is null, the worker threads 210-6 and 210-7 release the mutex lock(s) 214, and go to sleep. The worker threads 210-6 and 210-7 can be woken up when the state of the condition variable changes, for example, when the master thread 210-1 posts tasks on the shared resource(s) 212. In such a case, the worker threads 210-6 and 210-7 attempt to re-acquire the mutex lock(s) 214. For sake of illustration only, assuming that the worker thread 210-6 was first to query if the mutex lock(s) 214 is acquired. The spin control module 106 assigns the default recurrence to the worker thread 210-6. The thread identification module 216 further detects a thread waiting on the condition variable, i.e., worker thread 210-6, and assigns the reduced busy-wait time to the worker thread 210-7. In this manner, worker threads 210-2, 3, . . . , N, spin less number of times querying for the availability of the mutex lock(s) 214. This allows, for example, master thread 210-1 to access the shared resource(s) 212 and post tasks quickly, thereby increasing system performance.

FIG. 3 describes an exemplary method for assigning busy-wait time for threads, and is described with reference to FIGS. 1 and 2. The exemplary method may be described in the general context of computer executable instructions. Generally, computer executable instructions can include routines, programs, objects, components, data structures, procedures, modules, functions, etc., that perform particular functions or implement particular abstract data types.

The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein.

At a block 302, a thread attempts to acquire a mutex lock, in order to access a shared resource protected by the mutex lock. For example, one of the threads 210 attempts to acquire the mutex lock(s) 214 in order to access the shared resource(s) 212.

At a block 304, a determination is made to ascertain whether the mutex lock is available for acquiring by the threads. For example, the spin control module 106 determines whether the mutex lock(s) 214 is available for acquiring by one of the threads 210, say thread 210-1. If the determination indicates that the mutex lock is available and can be acquired by a thread ('Yes' path from the block 304) the mutex lock is acquired (at block 306). For example, one of the threads 210, say thread 210-1, acquires the mutex lock(s) 214 if the mutex lock(s) 214 is available. Once the mutex lock(s) 214 has been acquired, the shared resource(s) 212 can be accessed and the thread 210-1 can be executed. Once the shared resource(s) 212 has been accessed and the thread 210-1 has completed execution, the mutex lock(s) 214 is released.

If the determination indicates that the mutex lock is already acquired ('No' path from the block 304), then a further determination is made to check whether the mutex lock is associated with a condition variable (at block 308). For example, the spin control module 106 determines whether the mutex lock (s) 214 is associated with one or more condition variables.

If it is found that the mutex lock is not associated with any condition variables ('No' path from the block 308), the thread waiting for the mutex lock to become available spins for a fixed number of times based on a default busy-wait time (at block 316). For example, the spin control module 106 on determining that the mutex lock(s) 214 is not associated with any condition variables, assigns a default busy-wait time obtained from busy-wait time data 222.

If however, it is determined that the mutex lock is associated with one or more condition variables ('Yes' path from the block 308), then another determination is made to check whether any other threads are spinning on the mutex lock (at block 310). For example, the thread identification module 216 checks whether one or more threads, say thread 210-2, is spinning on the mutex lock(s) 214. If the thread identification module 216 determines that threads, such as thread 210-2, are spinning on the mutex lock(s) 214 ('Yes' path from the block 310), a reduced busy-wait time is assigned for the thread 210-1 (at block 312). In one implementation, the spin control module 106 assigns the reduced busy-wait time to the thread 210-2.

If, however, the thread identification module 216 determines that no threads, are spinning on the mutex lock(s) 214 ('No' path from the block 310), yet another determination is made to check whether any threads are waiting on the condition variable (at block 314). In one implementation, the thread identification module 216 determines whether any of the threads 210 are waiting for the condition variable.

If the thread identification module 216 detects one or more threads, such as thread 210-3, waiting for the condition variable ('Yes' path from the block 314), the thread 210-1 is assigned the reduced busy-wait time (the block 312). In one implementation, the spin control module 106 assigns the reduced busy-wait time obtained from the busy-wait time data 222. If however, the thread identification module 216 determines that no threads, such as one or more of threads 210, are waiting on the condition variable ('No' path from block 314), the default busy-wait time is assigned (a block 316) to the thread, i.e., thread 210-1, waiting for the mutex lock(s) 214 to become available. In one implementation, the default busy-wait time is obtained by the spin control module 106 from the busy-wait time data 222.

CONCLUSION

Although implementations for assigning busy-wait time for threads have been described in language specific to structural features and/or methods, it is to be understood that the invention (and not appended claims) is not necessarily limited to the specific features or methods described. Rather, the specific features and methods for assigning busy-wait time for threads are disclosed as exemplary implementations of the present invention.

We claim:

1. A method for controlling a busy-wait time assigned to a thread attempting to access a shared resource protected by a mutex lock associated with a condition variable, wherein a thread having acquired the mutex will access the shared resource when the state of the condition variable is favorable and will otherwise release the mutex and wait on the condition variable until the state becomes favorable, the method comprising:

attempting to acquire the mutex by a first thread and determining the mutex is unavailable for acquisition by the first thread; and assigning one of a default busy-wait time and a reduced busy-wait time to the first thread in response to determining the mutex is unavailable, wherein the reduced busy-wait time is less than the default busy-wait time and greater than zero, the assigning comprising:

assigning the default busy-wait time when there are no other threads waiting on the condition variable; and assigning the reduced busy-wait time when there is at least one other thread waiting on the condition variable.

2. The method of claim 1 wherein the assigning one of a default busy-wait time and a reduced busy-wait time to the first thread further comprises assigning the reduced busy-wait time when there is at least one other thread spinning on the mutex.

3. The method of claim 2 wherein the default busy-wait time is assigned when there are no other threads waiting on the condition variable and there are no other threads spinning on the mutex.

4. The method of claim 1 wherein the shared resource comprises a task queue and the condition variable indicates whether or not one or more tasks are present in the task queue.

5. The method of claim 4 wherein the first thread and the other threads are worker threads configured to dequeue one or more tasks from the task queue when accessing the shared resource, and further comprising a master thread configured to repeatedly attempt to post tasks to the task queue.

6. A computer program thread control device comprising:
 a processor;
 a memory comprising computer-readable instructions which, when executed, cause the processor to control a busy-wait time assigned to a thread attempting to access a shared resource protected by a mutex lock associated with a condition variable, wherein a thread having acquired the mutex will access the shared resource when the state of the condition variable is favorable and will otherwise release the mutex and wait on the condition variable until the state becomes favorable, the processor to:
 attempt to acquire the mutex by a first thread and determine the mutex is unavailable for acquisition by the first thread; and
 assign one of a default busy-wait time and a reduced busy-wait time to the first thread in response to determining the mutex is unavailable, wherein the reduced busy-wait time is less than the default busy-wait time and greater than zero, the processor to:
  assign the default busy-wait time when there are no other threads waiting on the condition variable; and
  assign the reduced busy-wait time when there is at least one other thread waiting on the condition variable.

7. The device of claim 6 wherein the assigning one of a default busy-wait time and a reduced busy-wait time to the first thread further comprises assigning the reduced busy-wait time when there is at least one other thread spinning on the mutex.

8. The device of claim 7 wherein the default busy-wait time is assigned when there are no other threads waiting on the condition variable and there are no other threads spinning on the mutex.

9. The device of claim 6 wherein the shared resource comprises a task queue and the condition variable indicates whether or not one or more tasks are present in the task queue.

10. The method of claim 9 wherein the first thread and the other threads are worker threads configured to dequeue one or more tasks from the task queue when accessing the shared resource, and further comprising a master thread configured to repeatedly attempt to post tasks to the task queue.

11. A non-transitory computer-readable storage medium (CRSM) having computer-executable instructions that when executed by a processor, causes the processor to control a busy-wait time assigned to a thread attempting to access a shared resource protected by a mutex lock associated with a condition variable, wherein a thread having acquired the mutex will access the shared resource when the state of the condition variable is favorable and will otherwise release the mutex and wait on the condition variable until the state becomes favorable, the instructions cause the processor to:
 attempt to acquire the mutex by a first thread and determine the mutex is unavailable for acquisition by the first thread; and
 assign one of a default busy-wait time and a reduced busy-wait time to the first thread in response to determining the mutex is unavailable, wherein the reduced busy-wait time is less than the default busy-wait time and greater than zero, the instructions cause the processor to:
  assign the default busy-wait time when there are no other threads waiting on the condition variable; and
  assign the reduced busy-wait time when there is at least one other thread waiting on the condition variable.

12. The CRSM of claim 11 wherein the assigning one of a default busy-wait time and a reduced busy-wait time to the first thread further comprises assigning the reduced busy-wait time when there is at least one other thread spinning on the mutex.

13. The CRSM of claim 12 wherein the default busy-wait time is assigned when there are no other threads waiting on the condition variable and there are no other threads spinning on the mutex.

14. The CRSM of claim 11 wherein the shared resource comprises a task queue and the condition variable indicates whether or not one or more tasks are present in the task queue.

15. The CRSM of claim 14 wherein the first thread and the other threads are worker threads configured to dequeue one or more tasks from the task queue when accessing the shared resource, and further comprising a master thread configured to repeatedly attempt to post tasks to the task queue.

* * * * *